(12) United States Patent
Kroon et al.

(10) Patent No.: US 12,720,037 B2
(45) Date of Patent: Aug. 25, 2026

(54) PRE-PROCESSING IMMERSIVE VIDEO

(71) Applicant: KONINKLIJKE PHILIPS N.V., Eindhoven (NL)

(72) Inventors: Bart Kroon, Eindhoven (NL); Christiaan Varekamp, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 142 days.

(21) Appl. No.: 18/281,317

(22) PCT Filed: Mar. 9, 2022

(86) PCT No.: PCT/EP2022/056053
§ 371 (c)(1),
(2) Date: Sep. 11, 2023

(87) PCT Pub. No.: WO2022/194641
PCT Pub. Date: Sep. 22, 2022

(65) Prior Publication Data

US 2024/0155100 A1 May 9, 2024

(30) Foreign Application Priority Data

Mar. 17, 2021 (EP) .................................... 21163214

(51) Int. Cl.
*H04N 13/351* (2018.01)
*G06V 20/70* (2022.01)
(Continued)

(52) U.S. Cl.
CPC ........... *H04N 13/351* (2018.05); *G06V 20/70* (2022.01); *H04N 21/21805* (2013.01);
(Continued)

(58) Field of Classification Search
CPC ........... H04N 13/351; H04N 21/21805; H04N 21/2662; H04N 21/816; H04N 21/84; G06V 20/70
See application file for complete search history.

(56) References Cited

U.S. PATENT DOCUMENTS 10,893,256 B2 * 1/2021 Hannuksela .............. G06T 3/04
11,095,907 B2 * 8/2021 Hannuksela ............ H04L 65/65
(Continued)

OTHER PUBLICATIONS

IEEE, "MPEG Immersive Video Coding Standard", IEEE, 2021, pp. 1521-1525. (Year: 2021).*
(Continued)

*Primary Examiner* — Cheng Yuan Tseng

(57) ABSTRACT

A method for preparing immersive video data prior to processing into an immersive video. The method comprises receiving immersive video data containing one or more images of a scene, the scene comprising one or more image regions, and obtaining a relevance factor for at least one of the image regions, the relevance factor being indicative of the relative importance of the image region to a viewer. The immersive video data is separated into one or more sets of region data, wherein each set of region data corresponds to the data of one or more image regions and, based on the relevance factor of an image region, a bitrate is selected at which the set of region data corresponding to the image region is to be sent to an external processing unit.

18 Claims, 4 Drawing Sheets

(51) Int. Cl.
*H04N 21/218* (2011.01)
*H04N 21/2662* (2011.01)
*H04N 21/81* (2011.01)
*H04N 21/84* (2011.01)

(52) U.S. Cl.
CPC ....... *H04N 21/2662* (2013.01); *H04N 21/816* (2013.01); *H04N 21/84* (2013.01)

(56) References Cited

U.S. PATENT DOCUMENTS

| | | | | |
|---|---|---|---|---|
| 11,138,460 | B2 * | 10/2021 | Fu | G06T 3/4038 |
| 11,354,084 | B2 * | 6/2022 | Murtaza | H04N 21/23439 |
| 11,521,656 | B2 * | 12/2022 | Srinivasan | G11B 27/036 |
| 11,558,610 | B2 * | 1/2023 | Zhang | H04N 19/82 |
| 11,671,625 | B2 * | 6/2023 | Hannuksela | H04N 21/23439 375/240.12 |
| 11,803,986 | B2 * | 10/2023 | Hur | G06T 9/40 |
| 11,909,983 | B2 * | 2/2024 | Hannuksela | H04N 21/23439 |
| 11,974,026 | B2 * | 4/2024 | Ilola | H04N 21/234345 |
| 12,088,971 | B2 * | 9/2024 | Hannuksela | H04N 21/234345 |
| 12,101,506 | B2 * | 9/2024 | Fleureau | H04N 19/70 |
| 12,108,082 | B2 * | 10/2024 | Kondrad | H04N 19/597 |
| 12,131,754 | B2 * | 10/2024 | Kondrad | H04N 21/2353 |
| 12,200,255 | B2 * | 1/2025 | Schwarz | H04N 19/29 |
| 2010/0295922 | A1 | 11/2010 | Cheung et al. | |
| 2013/0294513 | A1 | 11/2013 | Seregin et al. | |
| 2015/0116350 | A1 | 4/2015 | Lin et al. | |
| 2018/0295205 | A1 * | 10/2018 | Beran | H04L 65/612 |
| 2018/0332317 | A1 | 11/2018 | Song et al. | |
| 2019/0349598 | A1 * | 11/2019 | Aminlou | H04N 19/105 |
| 2019/0387224 | A1 * | 12/2019 | Phillips | H04N 19/177 |
| 2020/0336724 | A1 | 10/2020 | Lee et al. | |
| 2020/0359000 | A1 | 11/2020 | Shin et al. | |
| 2021/0067757 | A1 | 3/2021 | Yun et al. | |
| 2021/0281879 | A1 * | 9/2021 | Roimela | H04N 21/2353 |
| 2023/0247222 | A1 * | 8/2023 | Boyce | G06V 10/764 375/240.12 |

OTHER PUBLICATIONS

Lafruit, “Understanding MPEG-I Coding Standardization in Immersive VR/AR Applications”, 2019, SMPTE Montion Imaging, Journal , pp. 1-7.*

Jongbeom Jeong et al: “3DoF+ 360 Video Location-Based Asymmetric Down-Sampling for View Synthesis to Immersive VR Video Streaming”, Sensors, vol. 18, No. 9, Sep. 18, 2018 (Sep. 18, 2018), p. 3148.

“Test Model 8 for MPEG Immersive Video”, 133. MPEG Meeting; Jan. 11, 2021-Jan. 15, 2021; Online; (Motion Picture Expert Group or ISO/IEC JTC1/SC29/WG11), No. n20002 Jan. 30, 2021 (Jan. 30, 2021).

“Text of ISO/IEC FDIS 23090-2 2nd edition OMAF”, 132. MPEG Meeting; Oct. 12, 2020-Oct. 16, 2020; Online; (Motion Picture Expert Group or ISO/IEC JTC1/SC29/WG11), No. n19786 Dec. 30, 2020 (Dec. 30, 2020).

Yaqoob Abid et al: “A Survey on Adaptive 360° Video Streaming: Solutions, Challenges and Opportunities”, IEEE Communications Surveys & Tutorials, IEEE, USA, vol. 22, No. 4, Jul. 3, 2020.

Igor D D Curcio et al: [OMAF] Update on sub-picture segment priority ranks for graceful degradation: simulation results and signaling, 127. MPEG Meeting; Jul. 8, 2019-Jul. 12, 2019; Gothenburg; (Motion Picture Expert Group or ISO/IEC JTC1/SC29/WG11),,No. m494113 Jul. 2019.

International Search Report and Written Opinion from PCT/EP2022/056053 mailed Jun. 29, 2022.

Fleureau et al “ISO/JTC1/SC29/WG11 MPEG 2019, Graph Based Pruning for Natural Contents” Jan. 2020.

Fleureau, Julien & Chupeau, Bertrand & Thudor, Franck & Briand, Gerard & Tapie, Thierry & Dore, Renaud. (2020). An Immersive Video Experience with Real-Time View Synthesis Leveraging the Upcoming MIV Distribution Standard. 1-2. 10.1109/ICMEW46912.2020.9105948.

* cited by examiner

PRE-PROCESSING IMMERSIVE VIDEO

CROSS-REFERENCE TO PRIOR APPLICATIONS

This application is the U.S. National Phase application under 35 U.S.C. § 371 of International Application No. PCT/EP2022/056053, filed on Mar. 9, 2022, which claims the benefit of EP Patent Application No. EP 21163214.6, filed on Mar. 17, 2021. These applications are hereby incorporated by reference herein.

FIELD OF THE INVENTION

The invention relates to the field of immersive video broadcasting. In particular, the invention relates to preparing immersive video data before it is transmitted to an external processing unit.

BACKGROUND OF THE INVENTION

Immersive video generally relates to multiview (texture, depth and metadata) video captured to provide an immersive six degrees of freedom (6DoF) experience, typically to multiple viewers.

In the case of live events, texture information is acquired from physical cameras and depth information can be created from the texture information using stereo/multiview depth estimation (although an acquisition system may also include range sensors such as time-of-flight cameras or LIDAR). A-priori 3D model information such as the geometry of a sports stadium may also be encoded and sent with texture and depth maps. The metadata may include camera intrinsic and extrinsic parameters and/or other parameters such as depth quantization and semantic camera labelling. A large part of this metadata is estimated using processes such as camera calibration and multiview registration.

The current test model for immersive video (TMIV) includes an encoder and decoder/renderer implementation in conformance with the current version of the multiview immersive video (MIV) specification. The TMIV encoder includes the pruning of pixels and packing of patches into atlases, but excludes depth estimation, camera calibration and multiview registration. The MIV atlases can be coded using legacy 2D video codecs such as High Efficiency Video Coding, HEVC, or Versatile Video Coding, VVC, for which efficient hardware encoding solutions are available on the market.

A common idea is to thin a bitstream on a server with a low latency to a client to reduce the requirements on the client network link and device. For instance, when an immersive video bitstream is composed of multiple sub-bitstreams each corresponding to a volume of viewing positions, then only a few of these could be transmitted to the client based on the viewpoint of the viewer. This is called spatial access. Another example of thinning is to reduce the temporal resolution of the video data (sometimes called temporal access) and may either be used based on the network or the client device performance. This, in general, is called adaptive streaming and is used by virtually all video streaming services.

For immersive video, it is important to capture a scene with enough cameras to avoid the situation where a viewpoint (freely chosen by the viewer) has missing information. This is called disocclusion. Additionally, when scenes include non-Lambertian effects such as specular reflection, metallic objects, smoke, fire, etc. the light field cannot be accurately reconstructed from a small number of views. Finally, when depth values are estimated, quantized and coded, depth errors propagate to view synthesis errors that are particularly disturbing to the average viewer when the virtual viewport is relatively far from the closest camera viewpoints.

A problem with having many cameras is that the total resolution over all cameras (i.e. total sample rate) is effectively limited by the available 5G or satellite uplink bandwidth.

Performing onsite immersive video coding lowers the bandwidth requirement but is expensive due to the shipment and installation cost of processing units and does not scale well with the number of cameras. Ideally, there is a small processing unit per group of cameras and the processing units and uplink are connected via network switches. In this way, adding more cameras only involves plugging in more of the same small hardware units.

The problem with the onsite processing units is that pixel pruning and potentially patch packing is computationally expensive due to the 3D reconstruction to test for pixel redundancy. The approach in TMIV involves the view synthesis and blending of preserved pixels in basic views to all additional views. Even with GPU nodes, this approach is problematic because it chains up the depth estimation, pruning and packing operations. This increases latency and removes the opportunity to offload depth estimation to the cloud.

A specific problem is the aggregation of pruning masks, which substantially increases latency. For example, TMIV in anchor configuration buffers 32 frames to aggregate pruning masks and decides at once for the packing for this entire intra period of video frames. This reduces atlas data and improves video coding rate-distortion characteristics, but it also increases latency.

While some latency is acceptable, it becomes a problem when an immersive video and 2D video transmission into the same household have a substantially different delay. Although 32 frames may only amount to one second delay or less, there are cumulative delays in a typical broadcast chain.

Coding all or some views at low quality (high quantization) is also not a good solution because the block-artefacts (due to coding unit boundaries) make it difficult to perform depth estimation accurately. Thus, there is a need for an improved method of pre-processing immersive video data before it is sent to, for example, the cloud.

Igor D D Curcio: "[OMAF] Update on sub-picture segment priority ranks for graceful degradation: simulation results and signaling" 127. MPEG MEETING; 20190708-20190712; GOTHENBURG; (MOTION PICTURE EXPERT GROUP OR ISO/IEC JTC1/SC29/WG11) 3 Jul. 2019 proposes the signaling of segment priority ranks in order to help bandwidth management and enable graceful degradation during operations in viewport dependent streaming.

US 2018/332317 A1 discloses video of a scene for virtual reality or augmented reality having different portions with different importance metrics.

SUMMARY OF THE INVENTION

The invention is defined by the claims.

According to examples in accordance with an aspect of the invention, there is provided a method for preparing immersive video data prior to processing into an immersive video, the method comprising:

receiving immersive video data containing one or more images of a scene, the scene comprising one or more image regions;

obtaining a relevance factor for at least one of the image regions, the relevance factor being indicative of the relative importance of the image region to a viewer;

separating the immersive video data into one or more sets of region data, wherein each set of region data corresponds to the data of one or more image regions;

based on the relevance factor of an image region, selecting a bitrate at which the set of region data corresponding to the image region is to be sent to an external processing unit.

Generating an immersive video requires a relatively large amount of so-called immersive video data (e.g. a plurality of video feeds from different positions) and complex processing. Thus, for example, broadcasting a live event in immersive video requires extensive computational resources. However, it is usually impractical to bring such computational resources to live events and thus the immersive video data is typically sent to a cloud service (i.e. external processing unit) for the generation of the immersive video.

Sending the immersive video data to a cloud service is limited by the bandwidth of the network through which the immersive video data is sent. For example, 5G has a peak limit of about 20 gigabits per second (Gbit/s) but standard 5G speeds usually deliver around 100-400 megabits per second (Mbit/s). A 4K video at 30 frames per second, fps, requires around 20-50 Mbit/s (dependent on compression used) and immersive video data requires multiple video feeds to generate the immersive video.

Pre-processing of the immersive video data prior to sending it to the cloud service in order to fit all the immersive video data into the network is also possible, but typical methods of pre-processing increase the latency with which the immersive video data reaches the cloud service and thus increase the latency with which a viewer receives the immersive video.

The inventors realized that certain parts of an immersive video are not as important/relevant as other parts to a viewer (e.g. a player in a soccer match is more important than the grass on the field) and thus a lower amount of data can be sent for the less important (less relevant) parts.

The immersive video data will typically comprise image and video feeds from multiple cameras imaging a scene. For example, the scene may be a soccer field with multiple players. Image regions in the scene are identified and a relevance factor is given to at least some of the image regions. For example, the players on the field could be given a "high relevance" factor, the background/sky could be given a "not very relevant" factor and the field could be given a "not relevant" factor. The relevance factors could be obtained from an operator for known image regions that will be in the immersive video.

A method of determining relevance factors involves having a hierarchy of cameras which obtain the immersive video data. For the primary cameras in the hierarchy, all pixels could be considered relevant. For the secondary cameras (e.g. physically in between the primary ones), the relevance could be estimated using texture, motion and/or color analysis. If an image region cannot be fully predicted (i.e. interpolated/rendered) from a different, nearby, camera, then that image region may have a high relevance. However, if it can only be predicted at a diminished quality, then the pixel has some relevance and, if it can be fully predicted, then that pixel would have no relevance.

The immersive video data can be separated into "sets of region data". These sets could be a cropped version of the images/video from the immersive video data which includes an image region (or more than one). Based on the relevance factors of the image regions, the bitrate allocated to a set of region data can be selected, for example at a reduced bitrate compared to a nominal or maximum bitrate. For example, returning to the example of players on a soccer field, the set of data relating to the background/sky could be sent at a reduced bitrate (e.g. by sending a video of the background/sky at one fps instead of, for example, 30 fps). Additionally, the set of data relating to the field may not be sent if a model of the field will be used when rendering the immersive video. As the players have a "high relevance" factor, a full resolution 60 fps video of the players can be sent. The sets of region data could be obtained by, for example, segmenting the different image regions and cropping/pruning the images contained within the immersive video data to only contain the segmented image regions. Cropping and/or pruning the images can also reduce the bitrate required for the sets of region data.

The method may further comprise detecting one or more image regions in the immersive video data.

The "preparing" of immersive video may also be referred to as "pre-processing" the immersive video.

Selecting the bitrate of a set of region data may be implemented by:

selecting not to send the set of region data to the external processing unit;

selecting the frame rate with which the set of region data is sent;

selecting the spatial resolution of the set of region data;

selecting a quantization parameter for the set of region data; and/or cropping the images in the set of region data.

There exist various ways of setting the bitrate of a set of data to be sent, in particular reducing the bitrate compared to a nominal (maximum) value. For example, reducing the frame rate of a video will reduce the number of frames sent per second, and thus reduce the bitrate. Reducing the spatial resolution, cropping and/or pruning can also reduce the number of bits which is sent.

Separating the immersive video data into one or more sets of region data may comprise separating the immersive video data into blocks of data, labeling each block with an image region corresponding to the data present in the block and grouping the blocks of image region data into sets of region data based on the labels.

For example, each frame from a video can be divided (i.e. separated) into blocks of 64×64 pixels. Each block can be labelled, for example, using a classifier or segmentation algorithm to an image region present in the block. Thus, the group of blocks containing an image region can be used to define a set of region data.

The method may further comprise obtaining a maximum network bitrate with which the immersive video data can be sent, wherein selecting the bitrate with which a set of region data is to be sent is further based on the maximum network bitrate.

The method may further comprise creating relevance metadata containing the relevance factor of each one of sets of region data and/or the manner by which the bit rate is selected to be below the maximum network bitrate, if applicable.

Depending on the further processing of the immersive video data, it may be necessary to have information of any preparation (or pre-processing) which has been done to immersive video data. Thus, it may be beneficial to create metadata describing the relevance factors given to each image region and how the bitrate of a set of region data was reduced.

Obtaining a relevance factor may be based on receiving a relevance indication from the external processing unit. For example, all of the immersive video data may be initially uplinked at a very low frame rate (e.g. 1 fps) which is likely always possible. The depth estimator(s) in the cloud (i.e. external processing unit) could recognize where players are on a sports field and mark the bounding boxes of these in order to define relevant image regions. This information can be sent back to the capture computer which sent immersive video data to the cloud and can thus start to track the players.

The invention also provides a method for processing immersive video data with relevance factors, the method comprising:

- receiving immersive video data from an imaging system, the immersive video data comprising one or more sets of region data, wherein each set of region data corresponds to one or more image regions;
- receiving a relevance factor for at least one of the image regions;
- determining a depth map based on the immersive video data and the relevance factors;
- generating an immersive video based on the immersive video data and the depth map; and broadcasting the immersive video.

For example, a ground plane representing a sports field and a distant background plane can be fit to the immersive video data. This background model can be assumed to be static and thus used to generate an initial depth model. A depth search algorithm can now find depth values quicker since the values are constrained to stay "close" to the model using a given distance metric.

The method for processing immersive video data with relevance factors may further comprise:

- accumulating viewing statistics of the image regions in the immersive video;
- determining a relevance indication for at least one of the image regions based on the viewing statistics for the image regions; and
- sending the relevance indication to the imaging system, wherein the relevance indication is for use in adapting the relevance factor for the corresponding image region.

The invention also provides a computer program product comprising computer program code means which, when executed on a computing device having a processing system, cause the processing system to perform all of the steps of any one of the aforementioned methods.

The invention also provides a system for preparing immersive video data prior to processing into an immersive video, the system comprising:

- an imaging system comprising one or more camera groups, wherein each camera group is configured to obtain immersive video data containing at least one or more images of a scene, the scene comprising one or more image regions; and
- one or more processors configured to:
  - receive the immersive video data from the camera groups;
  - determine a relevance factor for at least one of the image regions, the relevance factor being indicative of the relative importance of the image region to a viewer;
  - separate the immersive video data into one or more sets of region data, wherein each set of region data corresponds to the data of one or more image regions;
  - based on the relevance factor of an image region, selecting the bitrate at which the set of region data corresponding to the image region is to be sent to an external processing unit.

Selecting the bitrate of a set of region data may be implemented by:

- selecting not to send the set of region data to the external processing unit;
- selecting the frame rate with which the set of region data is sent;
- selecting the spatial resolution of the set of region data;
- selecting a quantization parameter for the set of region data; and/or cropping the images in the set of region data.

Separating the immersive video data into one or more sets of region data may comprise separating the immersive video data into blocks of data, labeling each block with an image region corresponding to the data present in the block and grouping the blocks of image region data into sets of region data based on the labels.

The one or more processors may be further configured to receive a maximum bitrate with which the immersive video data can be sent, wherein selecting the bitrate at which a set of region data is to be sent is further based on the maximum bitrate.

The one or more processors may be further configured to create relevance metadata containing the relevance factor of each one of sets of region data and/or the manner by which the bit rate is selected to be below the maximum network bitrate, if applicable.

The one or more processors may be further configured to obtain the relevance factor based on receiving a relevance indication from the external processing unit.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
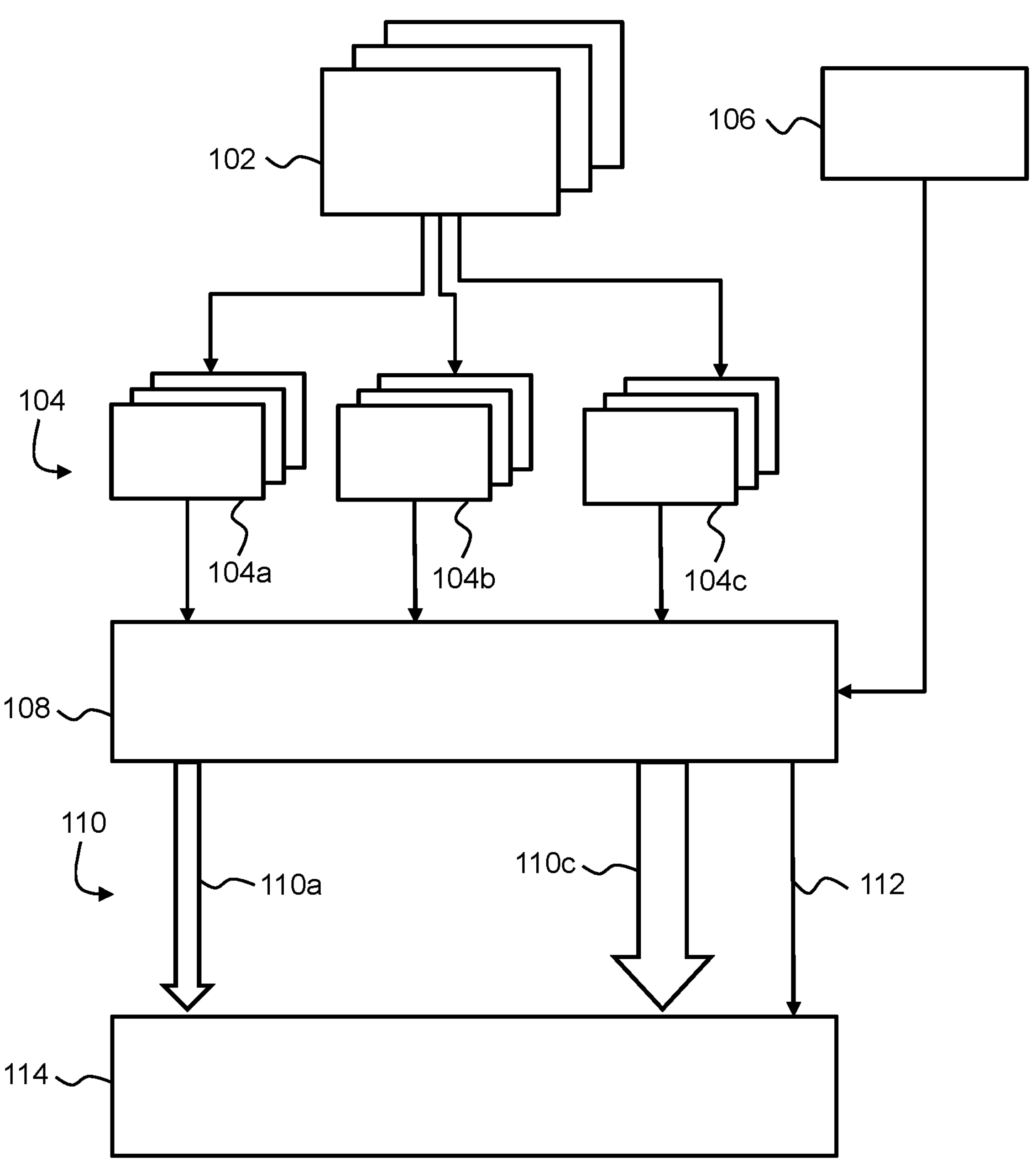
FIG. 1 shows a flow chart illustrating a method for preparing immersive video data.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a method for preparing immersive video data prior to processing into an immersive video. The method comprises receiving immersive video data containing one or more images of a scene, the scene comprising one or more image regions, and obtaining a relevance factor for at least one of the image regions, the relevance factor being indicative of the relative importance of the image region to a viewer. The immersive video data is separated into one or more sets of region data, wherein each set of region data corresponds to the data of one or more image regions and, based on the relevance factor of an image region, a bitrate is selected at which the set of region data corresponding to the image region is to be sent to an external processing unit.

FIG. 1 shows a flow chart illustrating the method for preparing immersive video data 102. The method is based on performing an onsite pre-processing (i.e. preparing) of the immersive video data 102 that is scalable with the number of cameras whilst deferring the full depth estimation, pruning and coding to an external processing unit 114 (e.g. cloud service, server etc.). Immersive video data 102 is the data required to create a full immersive video before it is rendered, coded etc.

The immersive video data 102 is obtained from a set of cameras imaging the same scene. The set of cameras will be divided into smaller camera groups and the immersive video data 102 from each camera group will be pre-processed separately.

The immersive video data 102 from each camera group is further divided into sets of region data 104. These sets of region data 104 correspond to the immersive video data 102 for different image regions of the scene. The image regions are different areas and/or viewing angles of the scene. For example, each object in the scene could correspond to different image regions. The image frames captured from different camera groups correspond to different image regions even if they are imaging the same object.

Relevance factors 106 are then obtained for the image regions (at least one). The relevance factors 106 could be, for example, partly obtained by a user input and/or by analysis of the image frames. Most of the analysis could be based on suitable intra-view, low-level image information such as color, texture, and motion (e.g. if it moves, it's relevant).

The relevance factors 106 are based on a hierarchy of camera groups. The hierarchy biases the relevance factors 106 of a subset of the camera groups such that the immersive video data 102 of the biased subset is generally considered more relevant (e.g. with higher relevance factors) than the other camera groups.

Based on the relevance factors 106 for the image regions, a pre-processor 108 selects a bitrate for the each one of the sets of region data 104. For the more relevant image regions, the corresponding sets 104 can be transmitted at a higher bitrate (and thus at a higher quality) whilst the less relevant image regions can be transmitted at a lower bitrate. Selecting the bitrate could be performed by, for example, reducing the frame rate of the image frames, reducing the resolution, pruning the image frames, cropping the image frames, etc.

The result of pruning is to assign labels to a pixel to "preserve" or "prune". This may be implemented as setting texture to black or grey, or having a separate map. The pixel pruning labels may be sent onsite between pre-processors of the camera groups.

The sets of region data 104 are packed and coded for each camera group resulting in multiple sub-bitstreams that are then merged into a single bitstream over the uplink to an external processing unit 114. For illustrative purposes, the separate sub-bitstreams are shown as arrows 110*a* and 110*c* for the sets of region data 104*a* and 104*c* with the widths of the arrows 110 indicating the relative bitrate selected for each set 104. In this case, the first set 104*a* may be of an image region with a relevance factor 106 "not very relevant" and thus the set 104*a* is transmitted at relatively low bitrate. The second set 104*b* may be of an image region with a relevance factor 106 "not relevant" and thus the bitrate was set to zero (i.e. not sent) and thus no arrow is shown. The third set 104*c* may be of an image region with a relevance factor 106 "very relevant" and thus may be sent at the maximum bitrate. A third arrow 112 shows the metadata of the immersive video data 102 (and the sets of region data 104) being transmitted to the external processing unit 114.

Preferably, there is some low-bandwidth, latency-insensitive inter-view information to improve sample rate/bitrate allocation over the sets 104. For example, a pipeline approach may be employed whereby, after coding a first group of frames, information is shared between the sets while a second group of frames is being coded. This information can then be used to optimize bitrate allocation over the sets for a third group of frames.

The transmitted immersive video data is suitable for further pruning, packing and video coding at the external processing unit 114. The goal of the onsite pre-processing is to reduce inter-view redundancy enough to squeeze the video through the uplink without degrading quality too much or causing too much latency.

The external processing unit 114 (e.g. server, cloud service etc.) running a full immersive video coding chain may send back parameters to the onsite pre-processor 108 to optimize sample rate/bitrate allocation. The external processing unit 114 can thus fully process/render/encode the pre-processed immersive video data and broadcast the immersive video.

The wording "sent" and "transmitted" will be used for the transfer of data from the pre-processor 108 to the external processing unit 114 whilst the wording "broadcasting" will be used for the transfer of the immersive video from the external processing unit 114 to viewers of the immersive video.

Figure 2:
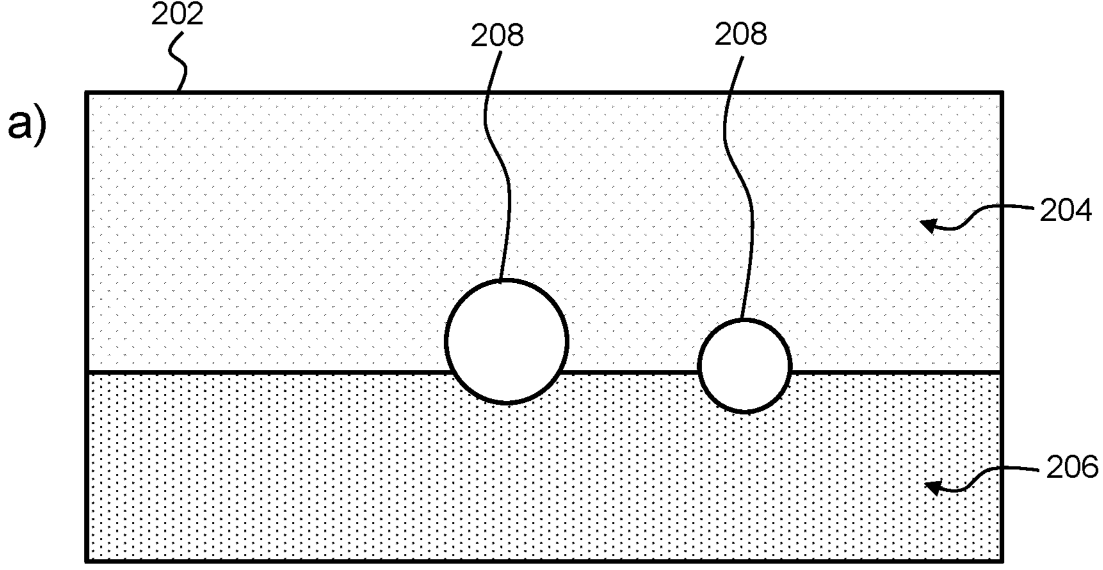
FIG. 2 shows an example of an image frame of a scene before and after pre-processing.
Figure 2:
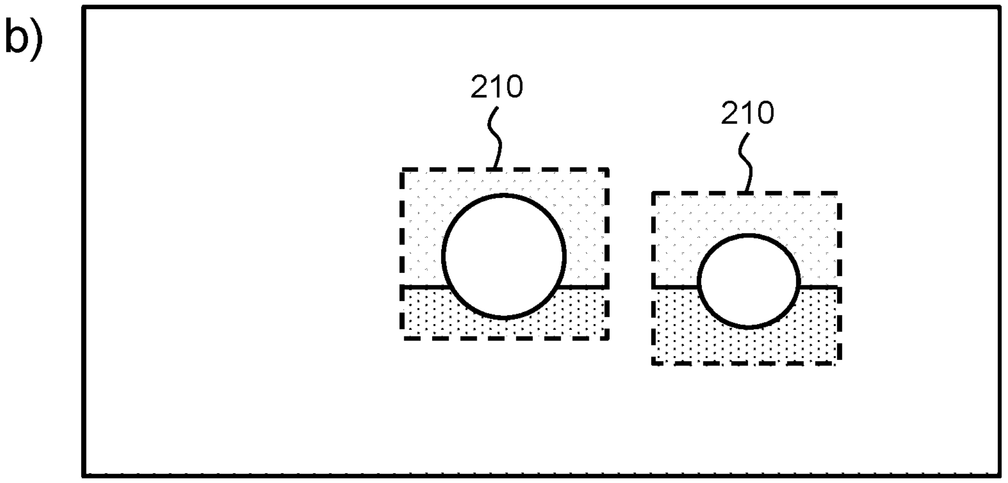

FIG. 2 shows an example of an image frame 202 of a scene before and after pre-processing. FIG. 2*a* shows the image frame 202 of a scene with two objects 208, a field 206 and the background 204. FIG. 2*b* shows the image regions 210 corresponding to the objects 208 in the scene. Other image regions 210 (not shown in FIG. 2) could include an image region 210 containing the background 204 and an image region 210 containing the field 206. The scene shown in FIG. 2 is a simplified model of a sports field (i.e. the field 206) with players (i.e. the objects 208).

The background 204 is usually not very relevant, compared to other regions of the scene, and thus the relevance factor 106 of the background 204 is likely to be relatively low. Thus, the image region 210 corresponding to the background 204 could be transmitted as an intra-coded video frame or JPEG image at a low temporal frequency (e.g. once every second). The low "frame rate" significantly reduces the bitrate required to transmit/send the image region 210 corresponding to the background 204.

Similarly, the field 206 is usually not very relevant and is likely to stay relatively constant. For example, the field 206 could be modelled at a server and thus not need to be transmitted (i.e. bitrate=0).

The players 208 are most likely the most relevant parts of the scene. In FIG. 2*b*, the players 208 are detected and segmented out as rectangles from the scene. The image regions 210 containing the players 208 can thus be transmitted using packed video at, for example, 30 or 60 Hz.

If the field 206 is not transmitted but modelled at the server, player shadows could be added at the server.

The captured image frames of a sports scene could be encoded as video at, for example, 30 Hz for the image regions 210 containing the players 208 and as (JPEG) images at 0.1 Hz for the background 204. Current board level computers can run both the video encoder and the still picture encoder at the same time. In order to stay within the maximum transfer limit from GPU to CPU, the still picture capture encoding could always be aligned to a predicted frame and not with an intra coded frame. Setting blocks of pixels to a constant YCbCr tuple in regions where the scene is less dynamic (e.g. no players 208) can considerably reduce up-link bitrate since less bits are spent on the high-frequency image parts (i.e. field 206 and background 204) of the scene.

The choice of relevance factors for the background and the field further depends on the camera group from which the image frame 202 was obtained. If the image frame 202 corresponds to a camera group high in the hierarchy, the whole image frame may be packed and transmitted at full frame rate. If the image frame 202 corresponds to a camera group low in the hierarchy, the background and field may not be packed at the full frame rate (or not packed).

Figure 3:
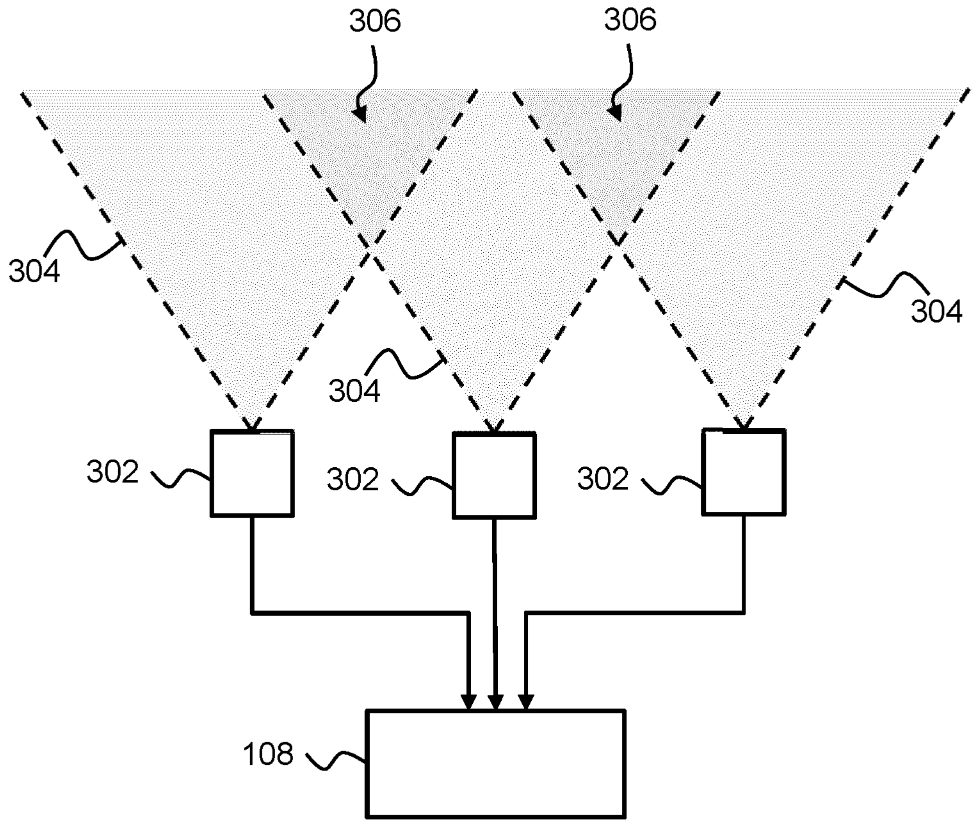
FIG. 3 shows a group of cameras connected to a pre-processor.

FIG. 3 shows a group of cameras 302 connected to a pre-processor 108. The field of view 304 for each camera 302 is shown. The areas 306 where the fields of view 304 intersect show regions of the scene which will be captured by more than one camera 302 in this group. Each camera 302 could be labelled as, for example, a primary camera or a secondary camera based on the camera groups they belong to and the hierarchy of camera groups. The primary cameras do not have intersecting fields of view 304 and thus all of the image frames from the primary cameras could be labelled as "relevant" regardless of the content. The primary cameras could be positioned such that they all image different image regions 210 but, as a whole, they image all of the scene.

The image regions 210 correspond to a camera group based on which camera 302 captured the images. For example, if the three cameras 302 are imaging a section of a sports field with no players, the image frames could be separated into the image regions 210 "background 1" and "background 2" based on whether they were captured by a primary camera or a secondary camera respectively. As there are no players, the whole section is likely not relevant and thus the image region "background 2" may not be transmitted whilst the image region "background 1" could be transmitted at a low frame rate.

Alternatively, if the three cameras 302 are imaging a section of the sports field with many players, both image regions 210 "players 1" and "players 2" could be transmitted at a high bitrate.

The pre-processing is performed per camera group having at least one camera 302. Most of the analysis to detect image regions is based on suitable intra-view image information. This information could, for example, be based on the amount of motion, a spatial frequency analysis, a color model, a foreground/background model, a neural network or any other learned filter (e.g. to detect humans) and/or domain-specific knowledge (e.g. "green" is field).

Specific camera capture, hardware and encoding modes can also be used. For example, a camera 302 can entirely stop sending data and start sending data again later depending on what happens in the field of view 304 of a camera 302. In this case, image frames may be encoded at irregular temporal intervals instead of, for example, at different constant frame rates.

If, for instance, all players on a sports field are on the far side of a field, less cameras 302 may be needed. For example, every other camera 302 in a spatial setup can stop capturing when a particular image region 210 is not required (i.e. no players on one side of the field) and start again when players come closer to the particular image region and thus a higher spatial density is required.

Some sensors allow multiple Area Of Interest (AOI) sensor readout. Capturing less or smaller AOIs directly results in less pixel data to transmit. If a sensor is cropped to one or multiple AOIs, then it may not be possible to use the sensor itself to control those crops. That information may need to be derived from another source such as another camera, domain knowledge or human operators.

Many encoder implementations exist that can encode multiple video and/or images at different resolutions and/or frame rates. For example, board level computers such as the Raspberry Pi support the simultaneous encoding of video (H.264) and images (JPEG). A 30 Hz H.264 video could in this case contain rectangular image regions 210 of players in the sports scene and still JPEG files could be written out every 10 seconds to update the background. On other systems it may be beneficial to use an intra-frame only video coding at a low frame rate. Higher-end GPUs with on-board encoder chips also allow simultaneous encoding of multiple videos with different frame rate and frame resolution and frame rate. Depending on the dynamic scene content, data could be assigned to one or more of the many videos being encoded.

Preferably, some inter-view information is available in order to determine relevance factors 106 for different image regions 210. For example, salient feature points can be matched with nearby views to create a sparse depth map. An estimated or expert-provided 3D scene model could also be used to determine relevance factors 106. There could also be an exchange of image/coding statistics to optimize pixel/rate allocation.

Additionally, per camera settings can be communicated to direct neighbors via (processing nodes and) physical cabling that is likely already present for the purpose of synchronized frame capture. Alternatively, since millisecond latency is not required, Bluetooth or Wi-Fi can be used to exchange the encoding strategy between cameras 302 in the setup.

Based on the relevance factors 106 determined (or obtained from, for example, the server), each camera group may tile up the camera views into sets of region data 104 of a suitable size and determine per set 104 to either: ignore the set 104, pack the set 104 at full resolution, pack the set 104 at reduced frame rate and/or pack the set 104 at a reduced spatial resolution.

The pre-processed information is suitable for further pruning, packing and video coding in a cloud service/server. The goal of the onsite pre-processing is to reduce inter-view redundancy enough to squeeze the immersive video data 102 through the uplink without degrading quality too much or causing too much latency.

In practice, the camera feed (video) could be separated into blocks. A suitable block size is the largest coding unit which is typically 64×64 pixels (in the case of HEVC). Each block can then be assigned to a set of region data 104 based on the contents of the block (e.g. does the block correspond to a player, the background or the field).

The relevance of each block can also be estimated based on the relevance of the set 104 to which it is assigned. As previously described, for a subset of cameras, all blocks from these cameras may be labelled relevant to ensure that all angles are captured. These can be called the basic views or the primary views. For example, each angle of a scene could be covered by at least one camera 302 and at least one view (from one camera 302) could be classed as "relevant" for each angle. Some blocks may be estimated to be entirely redundant and are not coded at all (e.g. if more than one camera 302 covers a particular angle, only one or two views may be needed).

Other blocks may be estimated to be static background and are coded at full spatial resolution but a lower temporal resolution (e.g. down from 60 Hz to 15 Hz). This is mainly to reduce complexity (sample rate) because the bitrate of a static background is not that high. Other blocks may be coded at a lower spatial resolution because they have less spatial detail. The relevance of a block could also be modified up or down based on the relevance of nearby blocks.

The blocks of equal frame rate can be combined into an atlas and encoded using a video codec. The multiple coded atlases of multiple groups can then be combined into a single bitstream suitable for the uplink.

Cloud transcoding and client rendering can be improved when metadata on relevance factors 106 is transmitted to the client. For instance, when a client knows that part of a video frame is effectively at a lower frame rate, then depth estimation, pruning, rendering operations can be skipped for a subset of the frames.

While onsite (i.e. where the cameras 32 are situated) it will be known how the video bitstreams were constructed in detail, a client may use a standard video decoder and API (e.g. Qualcomm, Android) and this information may be lost when sent to, for example, a server for further processing. By communicating some information such as the "temporal subsampling" or "motion degree" per patch or atlas, a better viewing experience can be provided at a given computational complexity.

In one example, when a depth estimator has a given budget for matching between views, this metadata can help to better target those matches which can result in a higher depth quality at a given cost (e.g. cloud computing tariff).

The metadata may include the result of the decision based on the relevance factors 106 (e.g. low frame rate) and may also include some motivation for that (high motion, human, foreground, etc.). The metadata could be on a patch level, or a transmitted as a low-resolution map. When these maps are small enough, e.g. 64×32 blocks for a 4K×2K frame, then these can be transmitted in the form of SEI messages or other forms of high-level syntax. Alternatively, these maps could be integrated into the video data using a small sub-frame with lossless video coding.

For some video codecs it is possible to separately encode regions of video frames independently and use different settings. These video codecs can typically also combine these separate bitstreams into a single video frame and bitstream. For HEVC, there is motion constrained tile sets (MCTS) and for VVC there are sub-pictures which is a more flexible concept. These techniques are advantageous because they enable parallel encoding with heterogeneous settings.

Most stereo and multiview depth estimators include a matching step whereby a candidate disparity vector (or scalar) is tested resulting, for instance, in a matching error such as a sum of absolute differences (SAD) value. The true disparity vector has a physical origin and is a real number. However, when estimating disparity on decoded video data, there is a bias towards disparity vectors that are an integer number of coding blocks.

While modem video codecs such as HEVC now have multiple block sizes, it is still possible to observe some blocking artefacts and when the remaining texture is limited, this may still fool a depth estimator.

A depth estimator that works on decoded video could be improved by taking into account the local coding structure of the involved views and correct for a bias towards aligning on block edges.

Alternatively, a depth estimator can be optimized to handle varying quantization levels where the matching is influenced by the quantization parameter (QP). For modem video codecs, the QP parameter can change between frames and even within frames.

A neutral network (of suitable complexity), or a similar machine learning solution, can be trained to predict the output of a high-quality pixel pruner. This network, with a forgiving threshold (favoring false alarms over misses), can be used as part of the pre-processing step by pre-pruning some of the immersive video data 102 based on the assigned relevance factors 106 to different image regions 210, while a full pruner can run in the cloud and shave off more pixels.

For online training, the neural network may also run in the cloud next to the full pruner. Improved coefficients for the neural network can then be (regularly) transmitted to the onsite pre-processer containing the neural network. This allows the neural network to improve performance for unique or changing local conditions.

Even without machine learning, the server can send cropping information back to the onsite pre-processor 108 to reduce the number of pixels to be sent through the uplink, thereby enabling a lower quantization parameter for subsequent frames.

Additionally, the server may be outfitted to receive and/or accumulate viewing statistics that can be used to generate parameters that can be sent back to the onsite pre-processor 108 to improve the selection of bitrates for the different image regions 210. When little or no viewers observe a region of a certain camera view, then this region can be safely cropped. When the odd viewer would look in that way, the pixel data can be rendered from another view at a reduced quality.

Figure 4:
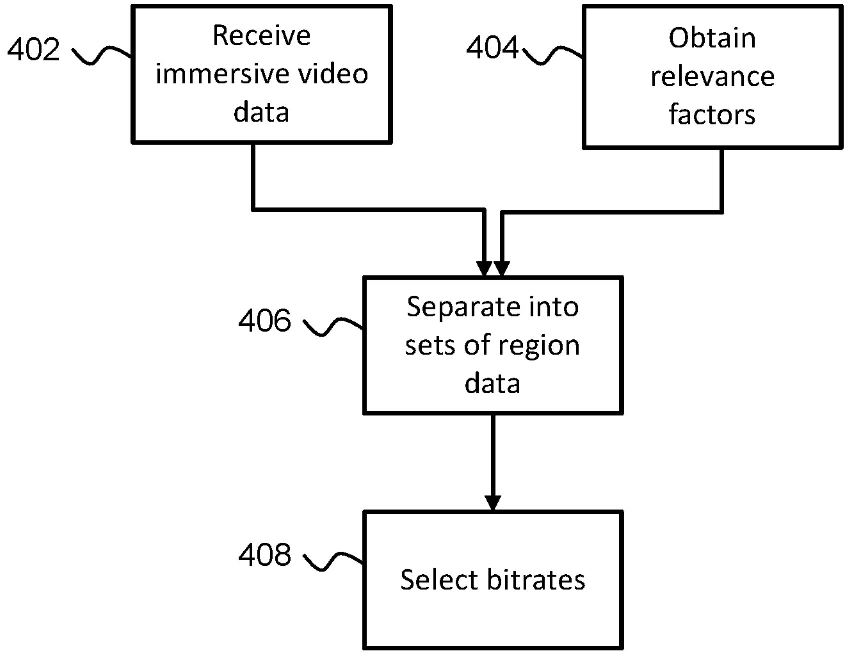
FIG. 4 shows a method for preparing the immersive video data.

FIG. 4 shows a method for preparing the immersive video data. Immersive video data is received, in step 402, containing one or more images of a scene from two or more camera groups. The immersive video data comprises one or more image regions and each image region corresponds to a camera group. In general, the immersive video data can be first divided into camera groups and the data for each camera group can be further sub-divided into image regions. For example, the camera groups could be formed of two groups; primary cameras and secondary cameras (as previously described above). A camera group contains one or more cameras.

The camera groups have a hierarchy of which camera groups contain more "relevant" or important visual data than other camera groups. In practice, the hierarchy of camera groups is meant to ensure that the amount of redundant data sent into processing is reduced whilst ensuring that enough information is sent to generate a full quality immersive video from the sent data.

In order to achieve this, a relevance factor is obtained, in step 404, for at least one of the image regions. The relevance factor is indicative of the relative importance of the image region to a viewer. Additionally, the relevance factor of an image region is based on the corresponding camera group and the hierarchy of the camera groups. In other words, the relevance factor considers whether the image region is relevant based on two factors; which camera group it was obtained from, and a relative importance to a viewer. The camera group from which an image region was obtained acts as a bias for the relevance factor whilst the relative importance further dictates the relevance factor.

The immersive video data is then separated into sets of region data, in step 406. Each set of region data corresponds to the data of one or more image regions. For example, a set of region data could be provided for each camera group or a set of region data could be provided for the image regions which have the same relevance factor.

A bitrate for the sets of region data is then selected, in step 408, at which bitrate the sets of region data will be sent to an external processing unit. The bitrate will depend on the relevance factors of the corresponding image regions in the sets of region data. Implementing the selection of the bitrate may be done in many ways as previously described. The selection of a bitrate based on the relevance factors thus enables the image regions from camera groups high up in the hierarchy to be sent at higher bitrates (i.e. better quality) whilst the image regions from the camera groups lower in the hierarchy may be sent at lower bitrates (i.e. lower quality) unless the relevance factor dictates otherwise (e.g. an image region contains visually important data).

The exact hierarchy of camera groups is somewhat arbitrary as each camera in an imaging system could form a different group or all of the cameras could be divided into two groups. In general, it is important that all of the "relevant" or "important" data is not pre-pruned or significantly reduced in quality due to the preparing method. However, as will be appreciated by a skilled person, data which is "relevant" or "important" can be very subjective and viewpoint dependent. It also depends on what the imaging system is trying to image.

The aim of the hierarchy is to indicate camera groups which may contain redundant data relative to other camera groups. The camera groups which are found to have redundant data may be placed lower in the hierarchy.

The skilled person would be readily capable of developing a processor for carrying out any herein described method. Thus, each step of a flow chart may represent a different action performed by a processor, and may be performed by a respective module of the processing processor.

As discussed above, the system makes use of processor to perform the data processing. The processor can be implemented in numerous ways, with software and/or hardware, to perform the various functions required. The processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A method comprising:

receiving an immersive video data,
- wherein the immersive data comprises at least one image of a scene from at least two camera groups,
- wherein the immersive video data comprises at least one image region,
- wherein each image region of the at least one image region corresponds to a camera group of the at least two camera groups;

obtaining a relevance factor for each of the image regions of the at least one image region,
- wherein the relevance factor of each image region is dependent upon a hierarchy of the at least two camera groups;
- wherein the hierarchy is based on a relative importance of each camera group;

separating the immersive video data into at least one portion of region data,
- wherein each of the at least one portion of region data corresponds to the data of at least one image region; and, selecting a bitrate at which the at least one portion of region data is sent to an external processing circuit based on the relevance factor of the first image region.

2. The method of claim 1, wherein the selecting of the bitrate comprises at least one of:

selecting so as to not to send the at least one portion of region data to the external processing circuit;

selecting the frame rate for the at least one portion of region data is sent;

selecting the spatial resolution of the at least one portion of region data;

selecting a quantization parameter for the at least one portion of region data; and cropping the images in the at least one portion of region data.

3. The method of claim 1, wherein the separating comprises:

separating the immersive video data into blocks of data;

labeling each block with an image region corresponding to the data present in the block; and separating the blocks of image region data into the at least one portion of region data based on the labels.

4. The method of claim 1, further comprising obtaining a maximum network bitrate with which the immersive video data is sent, wherein selecting the bitrate is based on the maximum network bitrate.

5. The method of claim 3, further comprising creating relevance metadata, wherein the relevance metadata comprises the relevance factor of each of the at least one of portions of region data.

6. The method of claim 1, wherein the obtaining of a relevance factor is based on receiving a relevance indication from the external processing circuit.

7. A computer program stored on a non-transitory medium, wherein the computer program when executed on a processor performs the method as claimed in claim 1.

8. A device comprising:

an imaging system comprising at least two camera groups, wherein each camera group of the at least two camera groups is arranged to obtain an immersive video data, wherein the immersive video data comprises at least one image of a scene, wherein the scene comprises at least one image region; and at least one processor circuit, wherein the at least one processor circuit is arranged to receive the immersive video data from the at least two camera groups, wherein the at least one processor circuit is arranged to determine a relevance factor for a first each image region of the at least one image regions, wherein the relevance factor of a first image region is dependent upon a hierarchy of the at least two camera groups;

wherein the hierarchy is based on a relative importance of each camera group;

wherein the at least one processor circuit is arranged to separate the immersive video data into at least one portion of region data, wherein each set of region data corresponds to the data of at least one image region, wherein the at least one processor circuit is arranged to select the bitrate at which the at least one portion of region data corresponding to the image region is sent to an external processing circuit based on the relevance factor of the first image region.

9. The device of claim 8, wherein the selecting of the bitrate comprises at least one of:

selecting so as to not to send the at least one portion of region data to the external processing circuit;

selecting the frame rate for the at least one portion of region data is sent;

selecting the spatial resolution of the at least one portion of region data;

selecting a quantization parameter for the at least one portion of region data; and cropping the images in the at least one portion of region data.

10. The device of claim 8, wherein the separating comprises:

separating the immersive video data into blocks of data;

labeling each block with an image region corresponding to the data present in the block; and grouping the blocks of image region data into the at least one portion of region data based on the labels.

11. The device of claim 8, wherein the at least one processor circuit is arranged receive a maximum bitrate with which the immersive video data can be sent, wherein selecting the bitrate is based on the maximum bitrate.

12. The device of claim 8, wherein the at least one processor circuit is arranged to create relevance metadata, wherein the relevance metadata comprises the relevance factor of each one of the at least one portions of region data.

13. The device of claim 8, wherein the obtaining of a relevance factor is based on receiving a relevance indication from the external processing circuit.

14. The method of claim 3, further comprising creating relevance metadata, wherein the relevance metadata comprises the manner by which the bit rate is arranged below the maximum network bitrate.

15. The device of claim 8, wherein the at least one processors circuit is arranged to create relevance metadata, wherein the relevance metadata comprises the manner by which the bit rate is arranged below the maximum network bitrate, if applicable.

16. A method comprising:

receiving immersive video data, wherein the immersive data comprises images of a scene from a plurality of camera groups, wherein each camera group provides the images of the scene from an image region, wherein the plurality of camera groups are arranged in a hierarchy based on a relative importance of each image region, obtaining a relevance factor for each image region, wherein the relevance factor of each image region is dependent upon the hierarchy of the camera groups, selecting a bitrate for each image region based on the relevance factor of each image region, wherein the bitrate of each image region corresponds to a bitrate at which the image region is sent to an external processing circuit.

17. The method of claim 16, comprising partitioning the immersive video data into a set of region data, wherein each region data comprises one or more image regions, wherein the partitioning is dependent upon the relevance factor of each of the one or more image regions in each region data, wherein selecting a bitrate for each image region comprises selecting a region bitrate for each region data of the set of region data, and wherein the bitrate for each image region corresponds to the region bitrate for the region data comprising each image region.

18. A non-transitory computer-readable medium comprising instructions that, when executed by a processing system, causes the processing system to perform the method of claim 16.

* * * * *